3,011,902
PROCESS OF MANUFACTURING CARBON BLACK PELLETS FOR INKS

Merrill E. Jordan, Walpole, Mass., assignor to Cabot Corporation, Boston, Mass., a corporation of Delaware
No Drawing. Filed May 27, 1954, Ser. No. 432,901
3 Claims. (Cl. 106—307)

This invention relates to carbon black pellets suitable for ink compounding and to a process for their production.

The need for pelleted, substantially dustless carbon blacks which can be incorporated in ink vehicles by the techniques customarily employed by ink makers has long been recognized. Blacks agglomerated by procedures long conventional for the production of rubber grade pellets can not satisfactorily be mixed into inks by such techniques because they can not be sufficiently dispersed in the vehicle. The pelleting process, whether carried out in the wet or dry state, causes sufficiently severe compacting of the black as to form hard aggregates within the pellet, some of which resist breakdown during milling of the ink compound. These residual aggregates, even though present to a relatively slight degree, are still too numerous and ink containing them is commercially unacceptable. Thus pellets which are quite satisfactory for any rubber compound are totally worthless for inks even though the quality of the black itself may otherwise be satisfactory.

Because of the well known advantages inherent in handling, shipping and working with carbon black in substantially dustless form attempts have been made in the past to manufacture satisfactory pallets for ink compounding. An example of such are the new ink pellets of my U.S. Patent No. 2,635,057, which are wholly satisfactory from a processing standpoint but which are currently somewhat more expensive to manufacture, ship and store than ordinary pellets due to relatively high liquids, especially water, content. The pellets of the present invention, therefore, constitute an important advance in the art since they can be produced in conventional equipment at no extra net expense and yet are satisfactorily dispersible in inks by customary procedures to provide a product well within grit and 325 mesh residue specifications.

It is the principal object of this invention to provide strong, dense, substantially dustless furnace carbon black pellets suitable for compounding in inks by currently conventional techniques.

It is also an object of this invention to provide a novel process for the production of such pellets without the use of water and which will not cause formation of an objectionable quantity of undispersable hard aggregates.

It is also an object of this invention to provide carbon black pellets suitable for compounding in ink of approximately the same size and shape as the pellets commercially available for rubber compounding, i.e., of about 200–4 mesh in size and substantially spherical shape.

The various objects of my invention are accomplished as follows. A nonevaporable, nonpolymerizable organic liquid is uniformly distributed on the selected fluffy ink grade furnace carbon black in the proportion of about 2–15%, preferably 2–10%, of the weight of the black. The black is then subjected to turbulent agitation by any convenient means such as a conventional rotating drum or pin-type pelletizer, for example of the type described in U.S. Patents Nos. 2,120,540 and 2,306,698, until pellets of the desired density are formed.

It is by reason of the critical conditions of the process that the product pellets are suitable for ink compounding. Thus, the amount of organic liquid used is limited to the specified range and it can be added to the black only before any significant amount of agitation of the black has taken place. In other words, the liquid must be extensively dispersed over the discrete particles of the fluffy black before agglomeration commences because otherwise too great a proportion of hard, undispersible aggregates of carbon black will be formed. Also unless at least about 2% liquid is added the percentage of hard aggregates will be too great and if more than about 15% liquid is used the pellets will be too soft and mushy to handle well in bulk.

The organic liquid employed for the purposes of this invention may be any nonaqueous ink compatible oil which is stable in the sense that it is not subject to oxidation polymerization and is not readily evaporable, i.e., has a normal mid-boiling point at atmospheric pressure of at least about 350° F. The preferred liquid is mineral oil or modified mineral oil of the type commonly used in the vehicles of inks designed to set, cure or dry mainly by physical means other than evaporation, for example, in news ink vehicles which dry mainly by absorption.

Within the specified range, the optimum amount of oil added to the black will be determined to some extent by the type of black being pelleted. As is well known in the art there is a wide variety of carbon blacks available for ink formulation ranging from those of definitely grayish color to those of jet black. In general the blackest blacks have the greatest surface areas while the gray blacks have low surface areas. As might be expected in the light of this invention I have found that the amount of oil required for its optimum practice is directly related to surface area. Thus for blacks having surface areas of 20–30 sq. meters per gram as little as 2% oil is enough to produce the most satisfactory pellets. On the other hand, for blacks in the 100 sq. meter per gram and above range, it is preferred to use at least 3% and more oil although pellets produced with the 2% minimum will meet requirements.

To produce the product of this invention an organic fluid or oil as described above is uniformly spread over the black, preferably as a finely-atomized spray. It is usually advantageous to preheat the oil to a temperature of 120–200° F. to facilitate dispersion, particularly when the oil is viscous and/or marginal amounts are used. The oil is then well mixed with the black prior to or in the initial stages of pelletization. It is, as I have said, the essence of the invention to coat the discrete particles of the black while still in the fluffy state with a reasonably uniform layer of the oil before it is agitated sufficiently to cause precompaction of the black and concomitant formation of hard aggregates.

To insure uniformity of coating it is better to use an excess of oil over the amount actually required for successful pellets. Hence the use of oil in amounts of 10–15% of the weight of the black are within the contemplation of this invention even though not essential for the production of good pellets. However, the skillful operator will naturally find it advantageous to use the precise minimum amount of oil required for the best possible pellets as there is no profit in supplying more oil than is necessary. Consequently, the preferred proportions of oil employed in the practice of this invention are between about 2–10% of the weight of the black particularly as no appreciable improvement in pellet quality accompanies higher oil concentrations.

It will be apparent that the oil may advantageously be sprayed on the black in the pelletizer at the beginning of the agitation step and before any extensive agitation has occurred. However, since the uniformity of distribution of the oil over the black particles will be the greater as the black is fluffier it will in some instances be the preferred method to mix the oil with the black either before the black is delivered to the pelletizer or, if in the pelletizer, before it has commenced to be tumbled about. However, as I have said, the fluid may be added to the black in the early stages of agitation and the term "prior to agitation" as used herein should be taken to mean prior to any amount of agitation sufficient to densify or agglomerate the black to an extent such that the fluid can not be substantially uniformly distributed over the bulk of the black being pelletized.

The pelletizing oil used in the process of this invention may be any nonaqueous, organic fluid stable against oxidative polymerization and undue evaporation which is compatible or miscible with the ink compound for which the pellets are intended as stated above. The oil may also consist of a mixture of different such fluids or it may, as a single fluid or mixture of fluids, contain various dissolved additives or dispersants such as resins, resinous materials, asphalts, etc. The preferred fluid in any instance is naturally the oil vehicle of the intended ink compound or a fluid composed of one or more of the ingredients of said vehicle.

In order to demonstrate more clearly the beneficial results attainable by the practice of my invention, specific examples are presented below. These examples are merely illustrative, however, and should not be considered as implying any limitation in the scope of the invention herein disclosed.

EXAMPLE 1

Sterling 99R, a gas furnace black having an apparent density in the fluffy state of about 15 lbs./cu. ft. and containing about 2% equilibrium moisture content and 1% volatile matter, was spread out in an open container and uniformly sprayed with a mineral oil containing 2% gilsonite dissolved therein. The fluffy black was stirred gently order to expose under surfaces while the spraying continued until 6% of oil by weight on the black had been added. The black was then transferred to a rotary drum of the conventional type used for pelletizing operations. After 15–20 minutes of tumbling type agitation in the slowly rotating drum excellent pellets were obtained having an apparent density of about 24 lbs./cu. ft. This pelleted black was substantially dust free and showed god bulk handling properties. The suitability of this product for use in ink making operations was tested by comparing publishing inks made from Sterling 99R at a 17% black loading using (A) 3 different batches of pellets made as described above, (B) fluffy Sterling 99R, and (C) pellets formed in the dry drum without oil. In each case the 17% by weight black-in-oil ink dispersion was made by the same procedure, using a high speed Eppenbach mill. The effectiveness of each dispersion was then measured by means of the 325 mesh ink residue and NYPC fineness gauge tests, both of which are standard tests used in the ink industry.

The 325 mesh residue is the weight percentage of grit or agglomerated solid matter in an ink. This value is calculated from the weight of material retained on a 325 mesh screen when as much as possible of a measured quantity of the ink to be tested is washed through it with xylol.

The NYPC fineness gauge is a metal block having in one face a carefully machined channel, about ½" wide and 6" long, the depth of which decreases gradually from 0.005" at one end to zero at the other. Beginning at the point where the channel is 0.004' deep and running to the point of zero depth a series of equally spaced lines are marked along the side of the channel in an arbitrary scale numbered from 0 to 10. To test an ink, a drop or two is placed at the deep end of the channel and drawn with a steel straight-edge toward the shallow end. As the film of ink thus drawn down in the channel becomes thinner and thinner toward the shallow end, smaller and smaller agglomerates will protrude from the surface of the ink film. The NYPC fineness number of an ink is the lowest number on the arbitrary scale at which specks appear in the film, the higher fineness numbers thus indicating a more finely dispersed ink.

The results of these tests on the several inks made as described above are shown in the following table.

Table I

PRINTING INKS CONTAINING 17% STERLING 99R BLACK

| Description of Black Used | | Description of Ink Produced | | |
|---|---|---|---|---|
| Form | Tap Density, lbs./cu. ft. | 325 Mesh Residue, Percent | NYPC Fineness Value | |
| (A₁) Pellets of Invention | 25 | 0.008 | 6–7 | |
| (A₂) Pellets of Invention | 23.4 | 0.030 | 4–6 | |
| (A₃) Pellets of Invention | 23.3 | 0.023 | 4–5 | |
| (B) Fluffy | 15 | 0.007 | 5–6 | |
| (C) Regular dry pellets | 27 | 0.249 | 0 | |

These data conclusively demonstrate the vast superiority of the pellets of this invention over those produced by conventional techniques as regards their dispersibility in ink vehicles. Thus, the 325 mesh residue from inks made with my pellets is an order of magnitude less than from the same ink made with regular pellets and only slightly greater than from that made with fluffy black.

In addition to the test described above, the several inks were also compared for drawn down color development, viscosity, etc. Little difference was noted among the inks in viscosity, plate wear, etc., but the ink made from regular pellets was not as black as that made from fluffy blacks or from the pellets of this invention both of which were substantially equivalent in color development.

Substantially the same results were obtained when the above example was repeated using 3% mineral oil containing 2% gilsonite instead of the 6% oil described above.

EXAMPLE 2

Elftex 5, a furnace black produced from a liquid hydrocarbon, having an apparent density in the fluffy state of about 11 lbs./cu. ft. and containing about 3% equilibrium moisture content and about 5% volatile matter, was charged in small batches of about 25 lbs. each to a pin type pelletizer. During about one to two minutes time while the pin type agitator turned slowly, 1.5 lbs. or about 6% by weight on the black of mineral oil was sprayed uniformly over the surface of each batch of fluffy black. As soon as each 1.5 lb. dose of oil had been sprayed on, the agitator was stopped, the oil black was discharged and the procedure was repeated on a new batch of black.

The fluffy Elftex 5 black wetted with oil in this manner was subsequently fed to a rotary pelletizing drum. After a suitable seed bed had been built up in the 5' x 8' drum, the oiled fluffy black was fed continuously into the inlet end of the rotary drum at a rate of about 200 lbs./hr. while finished pellets were withdrawn at the same rate from the opposite or discharge end. The pellets obtained had a tap density of about 21 lbs./cu. ft. and were nondusty, free-flowing and generally similar in size and shape to conventional carbon black pellets. Although slightly softer than most conventional (rubber black) pellets, they were sufficiently strong and free-flowing to meet bulk-handling requirements.

The suitability of these pellets for use in the manufacture of ink was tested by comparing news inks made at a concentration of 10% black from (A) the pellets of this example, (B) the fluffy Elftex 5 black, and (C) pellets made from fluffy Elftex 5 black by the conventional dry drum process. The dispersions were made as in Example 1, using a high speed Eppenbach mill, and the effectiveness of each dispersion was tested in the standard manner.

The results are shown in Table II below.

Table II

NEWS INKS CONTAINING 10% ELFTEX BLACK

| Description of Black Used | Ink Properties | | |
|---|---|---|---|
| Form | Tap Density, #/cu. ft. | Relative Viscosity [1] | 325 Mesh Residue, percent |
| (A) Pellets of Inventions [2] | 21 | 44 | 0.03 |
| (B) Fluffy | 11 | 46 | 0.01 |
| (C) Reg. Pellets | 22 | 50 | 0.44 |

[1] Stormer viscosity in sec./100 rev. with 100 gm. wt.
[2] All numerical values shown are averages for several samples taken at various times during a run of several hours duration.

EXAMPLE 3

The same process described in Example 2 was repeated using Sterling 99R black having an apparent density of about 14 to 15 lb./cu. ft., except in this case, the feed rate of oiled fluffy black to the 5′ x 8′ pelletizing drum was 1200 lbs./hr. instead of 200 lbs./hr. since pellets were made at a faster rate with this black. The pellets obtained had an apparent density of about 24–28 lbs./cu. ft. and were at least equal in quality to those made from Elftex 5 in Example 2.

The table below shows a comparison of the ink properties of (A) these pellets with the same black (B) in the fluffy state and (C) pellets produced in the same pelletizer without oil.

Table III

NEWS INKS CONTAINING 10% STERLING 99R BLACK

| Description of Black Used | Ink Properties | | |
|---|---|---|---|
| Form | Tap Density, #/cu. ft. | Relative Viscosity [1] | 325 Mesh Residue, percent |
| (A) Pellets of Invention [2] | 26 | 32 | 0.03 |
| (B) Fluffy [2] | 14.5 | 31 | 0.04 |
| (C) Reg. pellets | 29.8 | 31 | 0.86 |

[1] Stormer.
[2] Numerical values are averages of several separate determinations.

EXAMPLE 4

Another run was made similar to Example 1 but using mineral oil containing 5% gilsonite for both the pelletizing fluid and the ink vehicle. 7% by weight on the black of this oil was sprayed on prior to pelleting the black and the resulting pellets were used at 25% loading in preparing the ink. The resulting ink was compared with similar products made in the same Eppenbach equipment using 25% fluffy black and 25% of the same black in the form of regular dry drum pellets. The test results on the inks are shown in Table IV below.

Table IV

INKS CONTAINING 25% STERLING 99R BLACK

| Description of Black Used | Ink Properties | | |
|---|---|---|---|
| Form | Tap Density, #/cu. ft. | Relative Color Development | 325 Mesh Residue, percent |
| Pellets of Invention | 23 | 97 | 0.026 |
| Fluffy | 15 | 100 | 0.066 |
| Reg. pellets | 27 | 95 | 0.351 |

In this experiment the pellets of the present invention were actually more effectively dispersed than even the fluffy black.

Having thus described my invention, I claim:

1. A process for producing furnace carbon black pellets suitable for compounding in ink formulations which comprises uniformly dispersing over the particles of a mass of fluffy carbon black prior to any substantial agglomeration thereof mineral oil, in an amount equal to about 2–15% of the weight of the black, tumbling the black until substantially all of it has been converted to pellets and recovering the pellets.

2. The process of claim 1 wherein said oil is dispersed over the carbon black particles prior to tumbling.

3. The process of claim 1 wherein said oil has dissolved therein an additive selected from the group consisting of resinous materials and asphalts.

References Cited in the file of this patent

UNITED STATES PATENTS

| 1,245,700 | Geer | Nov. 6, 1917 |
| 1,263,082 | Lewis | Apr. 16, 1918 |
| 1,286,024 | Knowlton et al. | Nov. 26, 1918 |
| 2,167,674 | Offutt | Aug. 1, 1939 |
| 2,500,968 | Venuto | Mar. 21, 1950 |
| 2,635,057 | Jordan | Apr. 14, 1953 |
| 2,699,381 | King | Jan. 11, 1955 |

FOREIGN PATENTS

| 300,610 | Great Britain | June 8, 1929 |